(12) United States Patent
Sabo

(10) Patent No.: US 8,231,283 B2
(45) Date of Patent: Jul. 31, 2012

(54) WAVEGUIDE CONNECTOR WITH IMPROVED STRUCTURE FOR POSITIONING WAVEGUIDE INTO FERRULE

(75) Inventor: James M. Sabo, Harrisburg, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 49 days.

(21) Appl. No.: 12/960,588

(22) Filed: Dec. 6, 2010

(65) Prior Publication Data

US 2012/0141074 A1 Jun. 7, 2012

(51) Int. Cl.
*G02B 6/36* (2006.01)

(52) U.S. Cl. ............. 385/78; 385/53; 385/76; 385/77; 385/85; 385/120; 385/130; 385/49

(58) Field of Classification Search ............ 385/78, 385/53, 55, 58, 59, 60, 63, 71, 72, 76, 77, 385/85, 65, 43, 114, 146, 129, 130, 131, 385/132, 49

See application file for complete search history.

(56) References Cited

U.S. PATENT DOCUMENTS

| | | | |
|---|---|---|---|
| 5,071,219 A * | 12/1991 | Yurtin et al. ............. 385/78 |
| 5,315,678 A | 5/1994 | Maekawa et al. | |
| 5,619,604 A | 4/1997 | Shiflett et al. | |
| 5,737,463 A * | 4/1998 | Weiss et al. ............. 385/59 |
| 5,743,785 A | 4/1998 | Lundberg et al. | |
| 5,909,526 A * | 6/1999 | Roth et al. ............. 385/78 |
| 6,081,647 A * | 6/2000 | Roth et al. ............. 385/139 |
| 6,112,002 A * | 8/2000 | Tabuchi ............. 385/50 |
| 6,634,800 B2 | 10/2003 | Suematsu et al. | |
| 6,796,721 B2 | 9/2004 | Matsumoto et al. | |
| 6,819,855 B2 | 11/2004 | Fujiwara et al. | |
| 6,847,773 B2 | 1/2005 | Korenaga et al. | |
| 6,913,397 B2 * | 7/2005 | Kang et al. ............. 385/78 |
| 7,290,941 B2 * | 11/2007 | Kiani et al. ............. 385/78 |
| 7,295,743 B2 | 11/2007 | Yatsuda et al. | |
| 2001/0041034 A1 * | 11/2001 | Sasaki et al. ............. 385/88 |
| 2005/0135755 A1 * | 6/2005 | Kiani et al. ............. 385/78 |
| 2010/0111484 A1 * | 5/2010 | Allen ............. 385/135 |

* cited by examiner

*Primary Examiner* — Brian Healy
(74) *Attorney, Agent, or Firm* — Wei Te Chung; Andrew C. Cheng; Ming Chieh Chang

(57) ABSTRACT

A waveguide connector includes a ferrule with a number of waveguides inserted thereinto. The ferrule includes a front mating surface, a rear surface, front and rear passageways extending through the front and the rear mating surfaces, respectively. The front and the rear passageways are in communication with each other while the front passageway is thinner than the rear passageway. The waveguide each includes a number of cores and a cladding layer enclosing the cores. The front part of the cladding layer is of rectangular shape and includes four peripheral surfaces which are so limited by four inner surfaces of the front passageway, respectively, so as to precisely position the waveguides.

20 Claims, 25 Drawing Sheets

WAVEGUIDE CONNECTOR WITH IMPROVED STRUCTURE FOR POSITIONING WAVEGUIDE INTO FERRULE

BACKGROUND OF THE INVENTION

1. Field of the Invention

The present invention relates to a waveguide connector, and more particularly to a waveguide connector with improved structure to precisely position a waveguide into a ferrule thereof. The instant application relates to a copending application titled "CONNECTOR ASSEMBLY WITH IMPROVED STRUCTURE ON A BRACKET FOR MOUNTING CONNECTORS" and having the same filing date, the same applicant and the same assignee therewith.

2. Description of Related Art

Light-transmitting cores must be very precisely aligned for optimal signal transmission. Round fibers are self-centering due to placing round fibers into round holes or V-grooves. Related arts can refer to U.S. Pat. Nos. 6,634,800 and 5,315,678.

Waveguide is another kind of light-transmitting media different from the round fibers. U.S. Pat. No. 6,847,773 issued to Korenaga et al. on Jan. 25, 2005 discloses such a waveguide. Referring to FIG. 1 of this patent, traditional waveguide comprises a core for light-transmission and a cladding layer enclosing the core in order to prevent the light from escaping from the core. The cladding layer includes an upper layer and a lower layer with the core sandwiched therebetween. Such waveguide needs precise alignment in light-transmitting. U.S. Pat. No. 7,295,743 issued to Yatsuda et al. on Nov. 13, 2007 discloses a waveguide connector adapted for securely positioning a waveguide thereof. The waveguide connector comprises a ferrule defining an opening adjacent to a mating surface thereof for receiving the waveguide. Inner side of the opening is provided with at least one convex portion adjacent to the mating surface. Accordingly, the free end of the waveguide is cut out to form a step portion for abutting against the convex portion in order to restrict over-insertion of the waveguide. However, forming the step portion of the waveguide and the convex portion of the ferrule need additional manufacturing cost.

Hence, a waveguide connector with improved structure for aligning a waveguide to a ferrule thereof is desired.

BRIEF SUMMARY OF THE INVENTION

The present invention provides a waveguide connector including a ferrule and a waveguide inserted into the ferrule. The ferrule includes a front mating surface, a rear surface opposite to the front mating surface, a front passageway extending through the front mating surface, and a rear passageway extending through the rear surface. The front passageway and the rear passageway are in communication with each other, and the front passageway is thinner than the rear passageway. The waveguide includes a plurality of cores and a cladding layer enclosing the cores. A rear part of the cladding layer resides in the rear passageway and a front part of the cladding layer is configured to be received in the front passageway along a rear-to-front direction. The cores are exposed at the front mating surface for light transmission. The front part of the cladding layer is of rectangular shape and comprises four peripheral surfaces confined by four inner surfaces of the front passageway, respectively, so as to precisely position the waveguide.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 15($b$) is a cross-sectional view of the waveguide connector similar to FIG. 15($a$), while the outer housing is driven to be backwardly moveable with respect to the original status;

DETAILED DESCRIPTION OF THE PREFERRED EMBODIMENT

Figure 1:
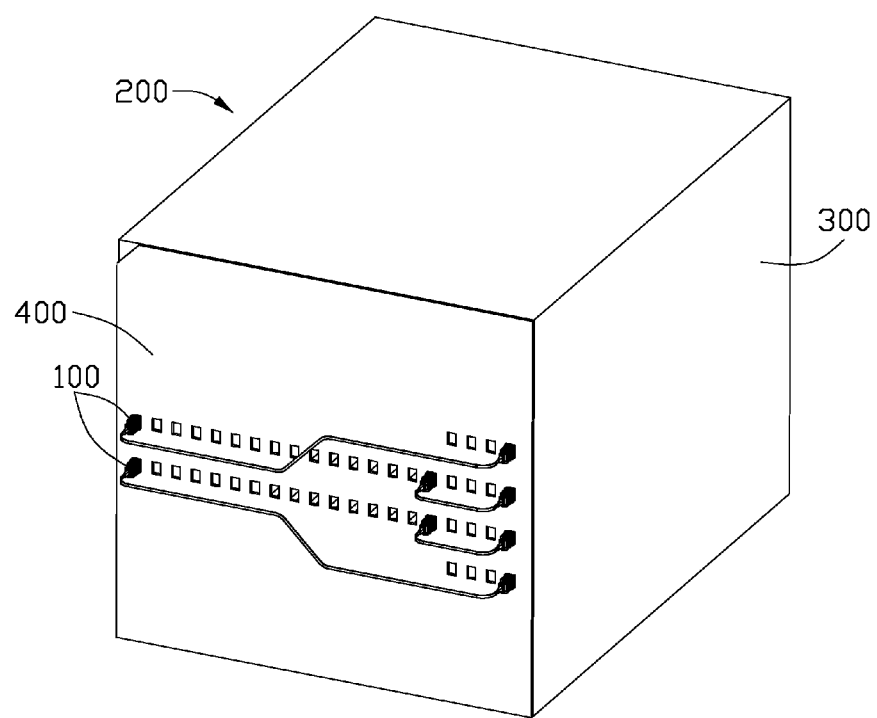
FIG. 1 is a perspective view of a waveguide connection system employing waveguide connectors connecting a backplane and a plurality of daughter cards in accordance with a preferred embodiment of the present invention.

Reference will now be made to the drawing figures to describe the preferred embodiment of the present invention in detail. FIGS. 1-4 illustrate a waveguide connection system 200 including a frame 300, a backplane 400 mounted at a rear side of the frame 300, a plurality of daughter cards 500 parallel residing in the frame 300, and a plurality of waveguide connectors 100 coupled with each other for connecting the daughter cards 500 and the backplane 400 for light transmission.

Figure 2:
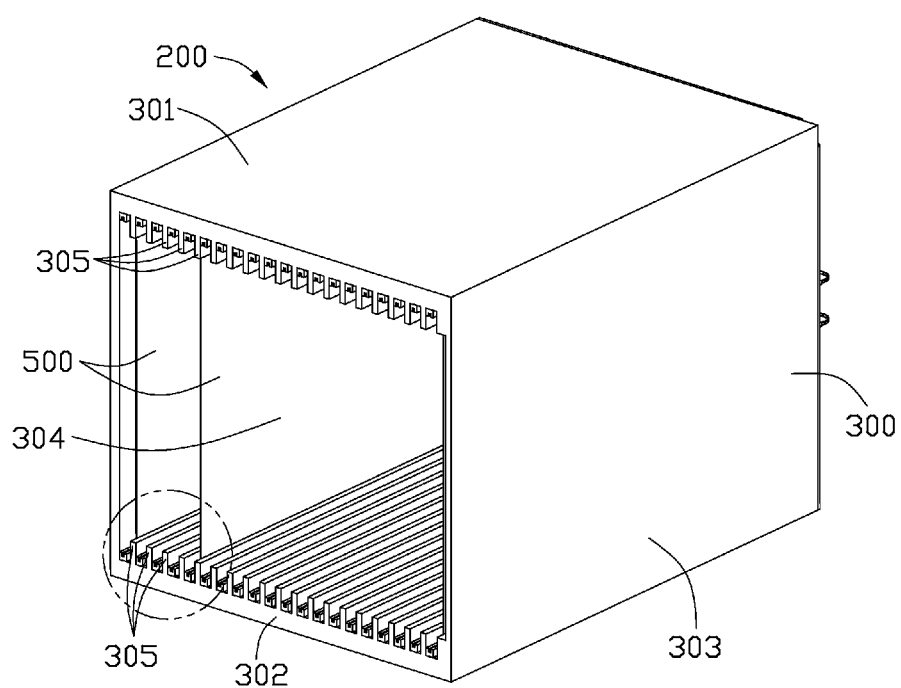
FIG. 2 is another perspective view of the waveguide connection system as shown in FIG. 1, while taken from another aspect.
Figure 3:
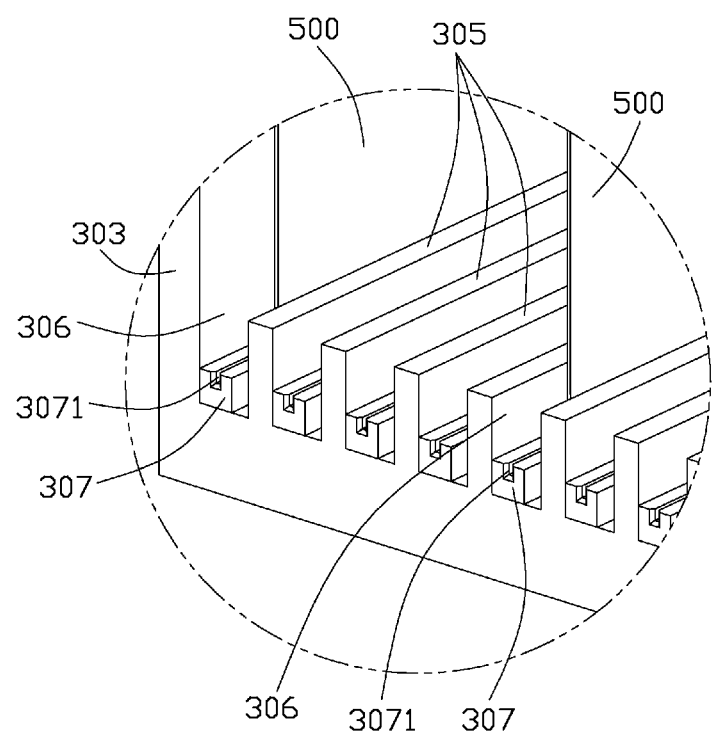
FIG. 3 is an enlarged view of a circle portion as shown in FIG. 2.
Figure 4:
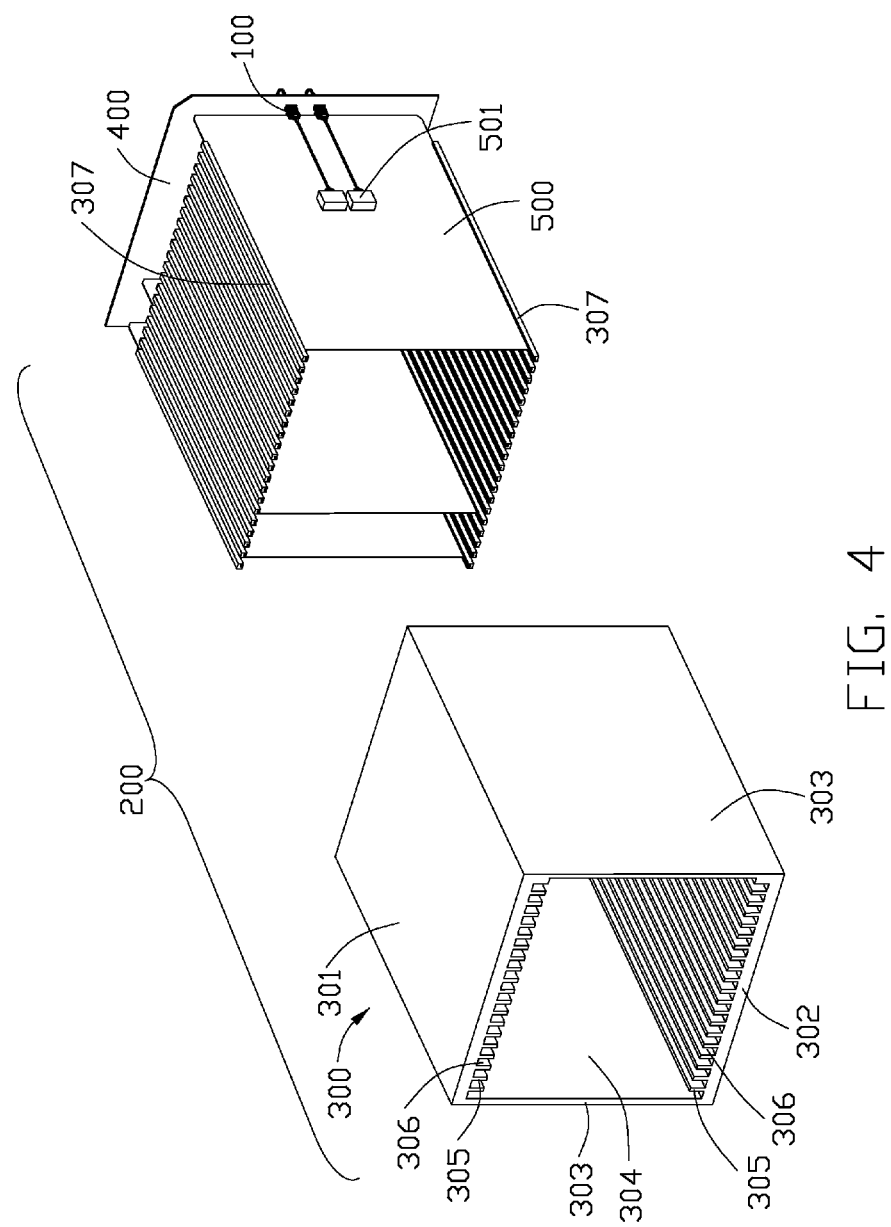
FIG. 4 is a partly exploded view of the waveguide connection system as shown in FIG. 1, from which a frame is disassembled.

Referring to FIG. 4, the frame 300 is of rectangular shape and includes a top wall 301, a bottom wall 302, and a pair of side walls 303 connecting the top and the bottom walls 301, 302 to jointly form a receiving chamber 304. Inner sides of the top and the bottom walls 301, 302 include a plurality of ribs 305 and a plurality of slots 306 formed by adjacent ribs 305 and the ribs 305 with adjacent side wall 303. A plurality of slats 307 are employed to position the daughter cards 500 in the frame 300. The slots 306 formed on the top wall 301 are aligned with the corresponding slots 306 formed on the bottom wall 302. The slats 307 are received in the corresponding slots 306 formed on the top and the bottom walls 301, 302. Each slat 307 includes a slit 3071, as shown in FIG. 3, for receiving one of upper and lower edges of the daughter card 500. Referring to FIGS. 2 to 4, in assembly, the slats 307 are fixed in the slots 306 along a horizontal direction and then the daughter cards 500 are inserted into the slits 3071 so that the daughter cards 500 can be clipped by the slats 307 for fixation. Alternatively, the slats 307 are mounted on the upper and the lower edges of each daughter card 500 which is then inserted into the slots 306. The daughter cards 500 are separated from each other and are arranged in a parallel manner. Each daughter card 500 is perpendicular to the backplane 400 and comprises a plurality of optoelectronic (OE) modules 501 as shown in FIG. 4.

Figure 18:
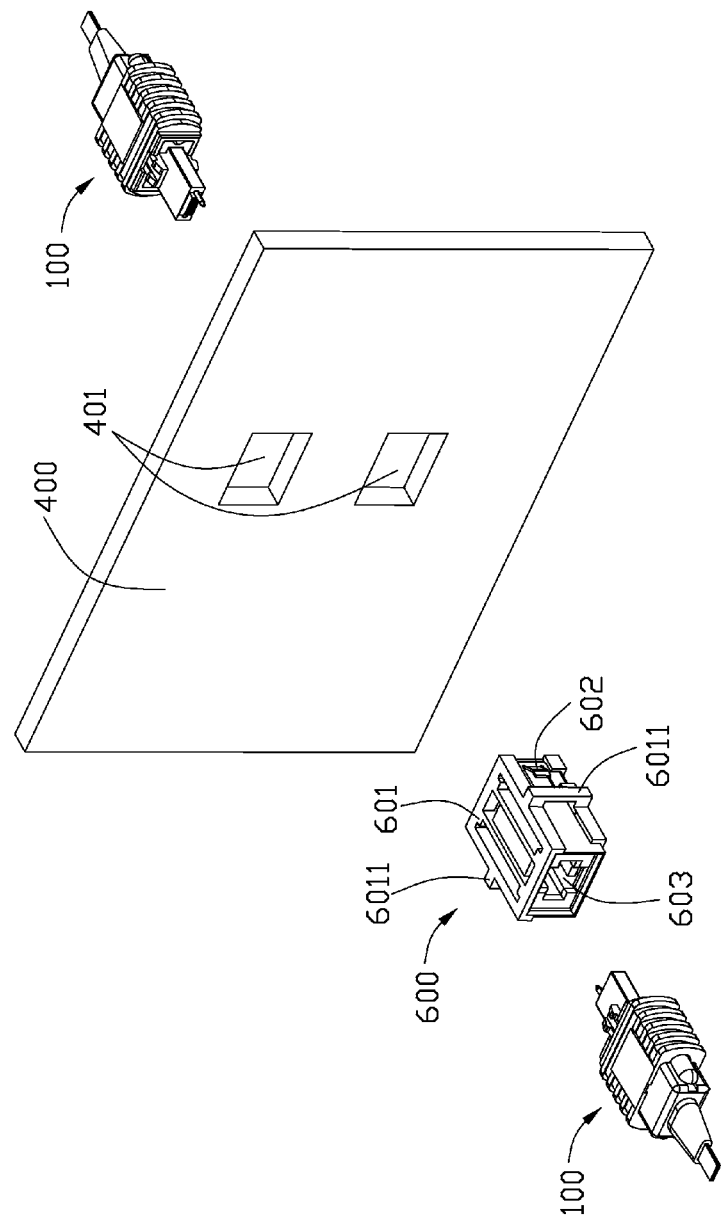
FIG. 18 is a disassembled view of a part waveguide connection system showing a pair of waveguide connectors associated with a coupler before mounted to the backplane.
Figure 19:
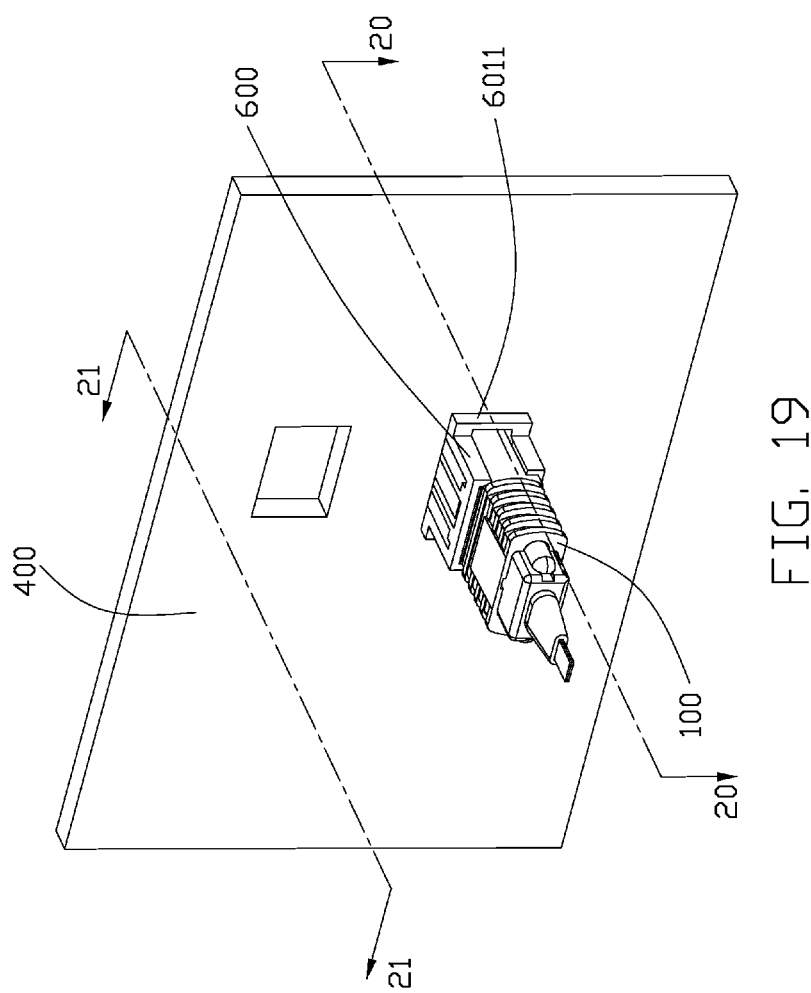
FIG. 19 is an assembled view of the waveguide connection system as shown in FIG. 18.
Figure 20:
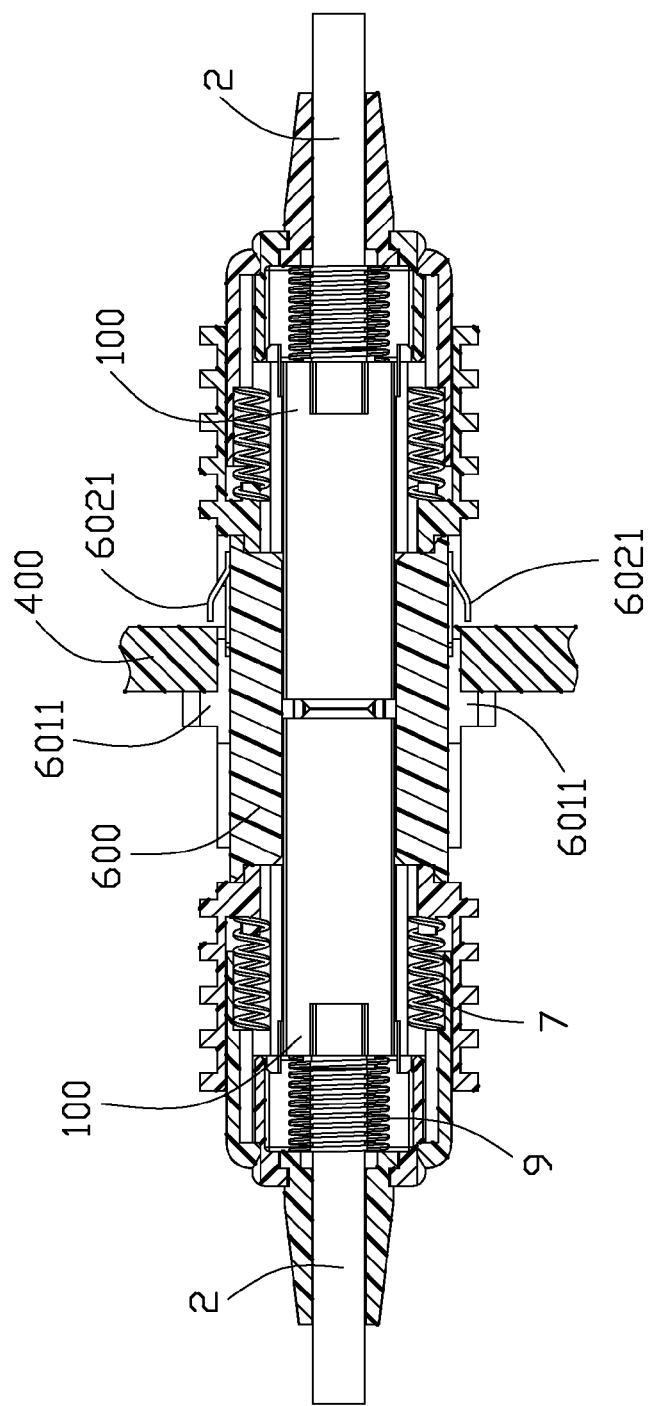
FIG. 20 is a schematic cross-sectional view of the waveguide connection system taken along line 20-20 of FIG. 19, showing the pair of waveguide connectors coupled with each other.
Figure 21:
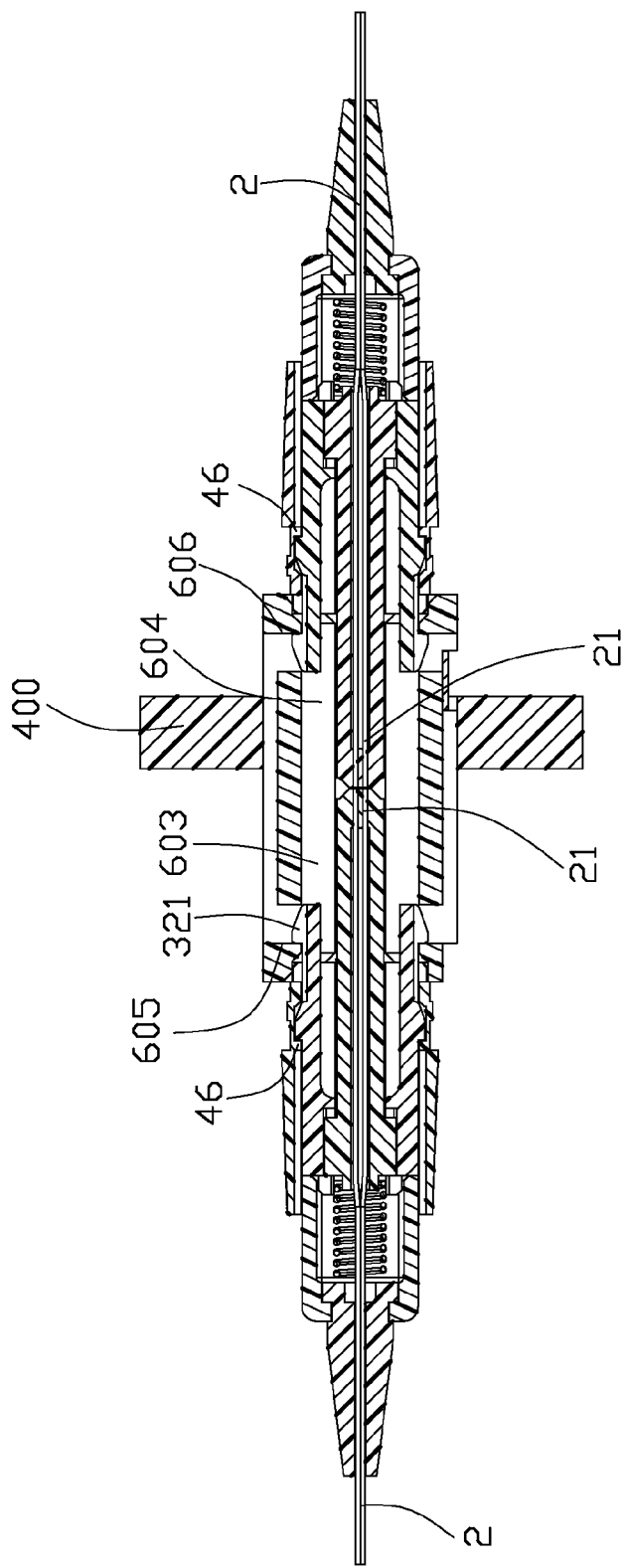
FIG. 21 is a cross-sectional view of the waveguide connection system taken along line 21-21 of FIG. 19.

Referring to FIGS. 18 to 21, the backplane 400 defines a plurality of mounting holes 401 for mounting a plurality of couplers 600 as shown in FIGS. 1 and 19. Each coupler 600 includes a housing 601 and a U-shaped metal spring 602 attached to the housing 601. As shown in FIG. 20, the metal spring 602 includes a pair of tabs 6021 sidewardly protruding therefrom. When the coupler 600 is inserted into the mounting hole 401 of the backplane 400 till a pair of ribs 6011 engaging a front side of the backplane 400, the pair of tabs 6021 extend through the mounting hole 401 to reach a rear side opposite to the front side. The pair of tabs 6021 are adapted for abutting against the rear side of the backplane 400 in order to prevent the coupler 600 from falling off from the mounting hole 401. The housing 601 defines a first receiving cavity 603 through one end thereof and a second receiving cavity 604 communicating with the first receiving cavity 603 and through the other end thereof. Besides, the housing 601 includes a pair of first step walls 605 exposed to the first receiving cavity 603 and a pair of second step walls 606 exposed to the second receiving cavity 604. Under this arrangement, when a pair of waveguide connectors 100 are inserted into the first and the second receiving cavities 603, 604 from opposite directions, the pair of waveguide connectors 100 are lockable with the first and the second step walls 605, 606 for fixation, as shown in FIG. 21. As a result, the pair of waveguide connectors 100 can meet inside the coupler 600 for stable light transmission, as shown in FIG. 20.

Referring to FIGS. 5 to 17, each waveguide connector 100 includes a ferrule 1, a plurality of waveguides 2 inserted into the ferrule 1, an inner housing 3 for the ferrule 1 partly extending therethrough, an outer housing 4 slideably mounted on the inner housing 3, an outer boot 5 locking with the inner housing 3, and an inner boot 6 partly received in the outer boot 5. The detailed structures of each component will be detailedly described.

Figure 10:
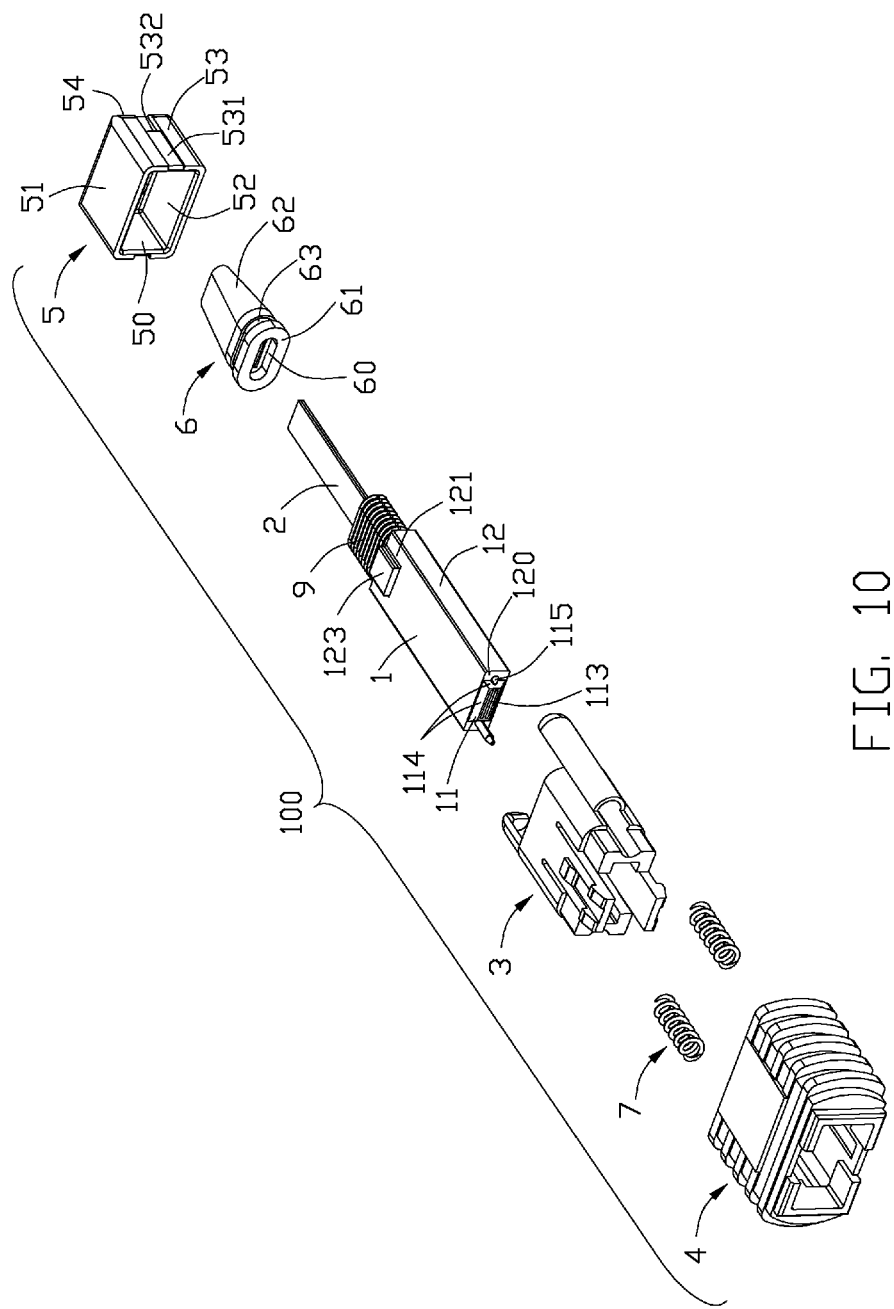
FIG. 10 is an exploded view of the waveguide connector as shown in FIG. 9.
Figure 11:
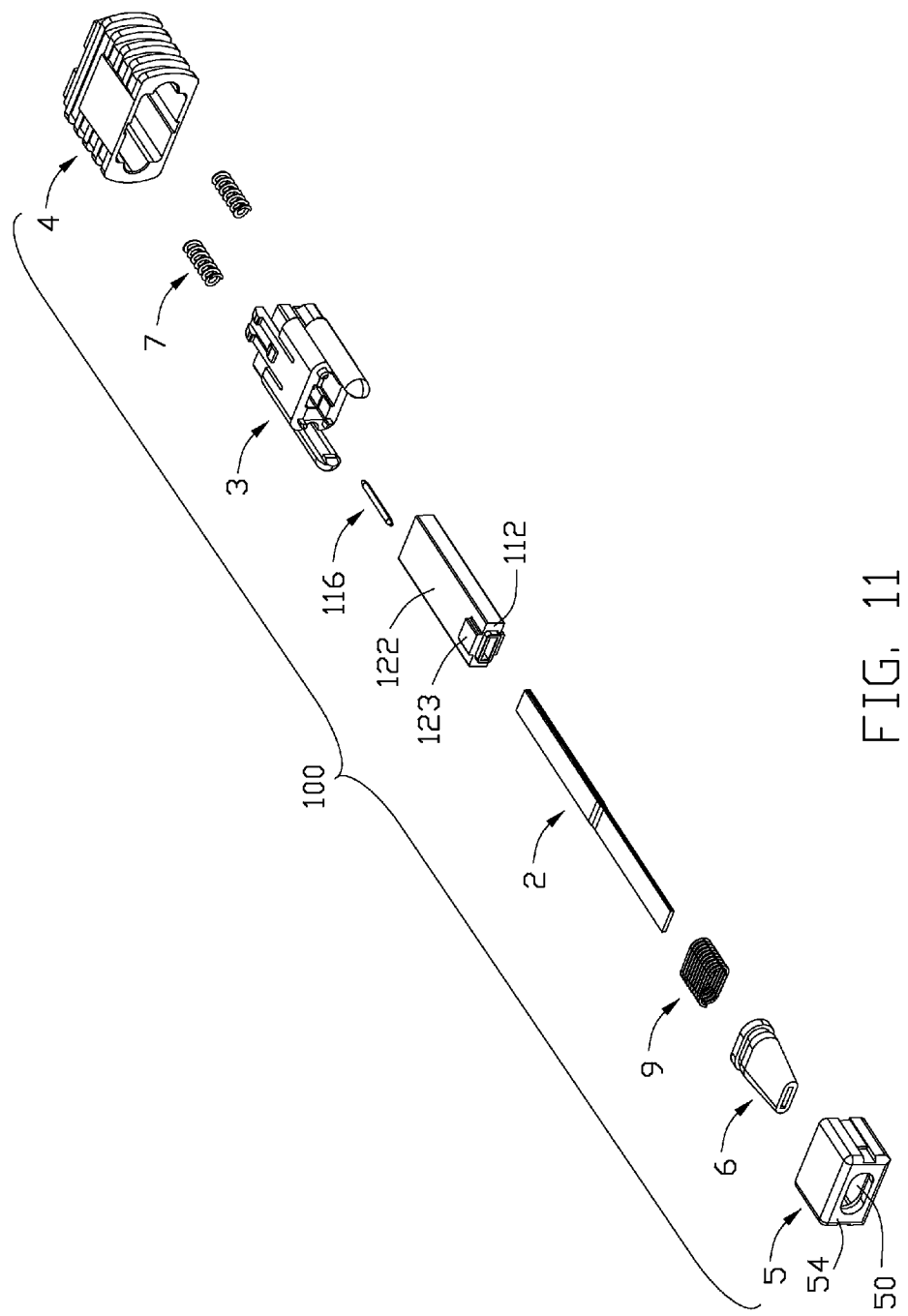
FIG. 11 is another exploded view of the waveguide connector while taken from another aspect.
Figure 12:
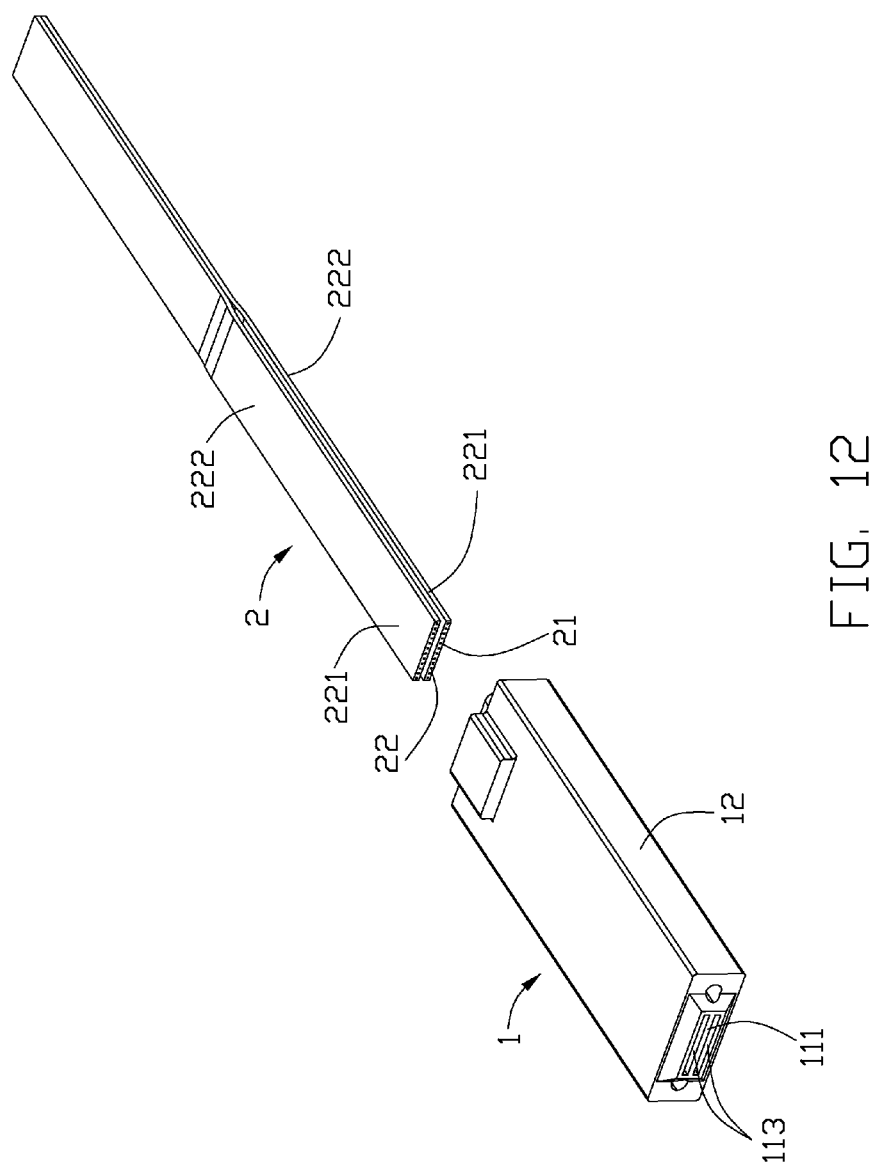
FIG. 12 is a prospective view of a ferrule and waveguides separated from the ferrule.
Figure 13:
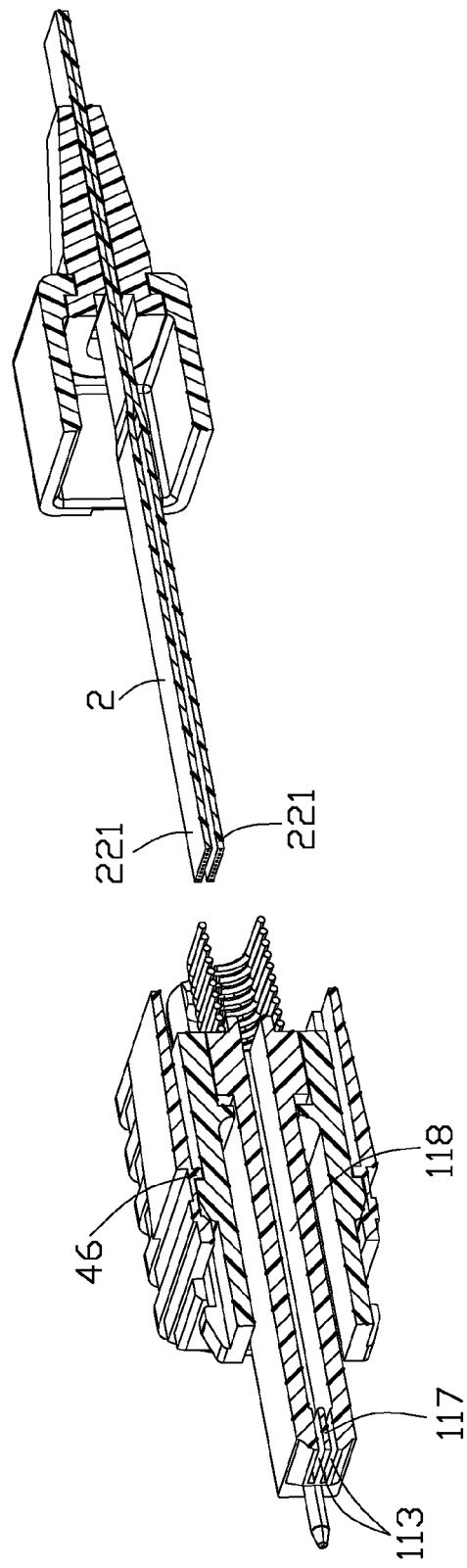
FIG. 13 is a cross-sectional view of the waveguide connector before the waveguides are inserted into the ferrule.

Referring to FIGS. 10 to 14, the ferrule 1 includes a front mating surface 111, a rear surface 112 opposite to the front mating surface 111, first and second front passageways 113 extending through the front mating surface 111, and a rear passageway 118 extending through the rear surface 112. The first and the second front passageways 113 are parallel to each other and are in communication with the rear passageway 118. The first and the second front passageways 113 are separated from each other by a partition wall 117, as shown in FIG. 13. Each of the first and the second front passageways 113 is thinner than the rear passageway 118. The ferrule 1 includes a rectangular body 12 and a contractive protrusion 11 integrally extending forwardly from a front surface 120 of the body 12. The front mating surface 111 and the rear surface 112 are formed on the contractive protrusion 11 and the body 12, respectively. The contractive protrusion 11 comprises four slant side surfaces 114. A pair of holes 115 are formed at the joints of the front surface 120 and the corresponding slant surfaces 114, as best shown in FIG. 10, wherein one of the holes 115 is fitted with a guiding post 116 and the other hole 115 is empty.

The body 12 includes an upper surface 121, a lower surface 122, and a pair of position blocks 123 protruding beyond the upper and the lower surfaces 121, 122, respectively. The first and the second front passageways 113 are stacked one above the other and are separated by the partition wall 117 located therebetween. Each rectangular passageway 113 includes four inner surfaces for positioning the waveguides 2.

Figure 5:
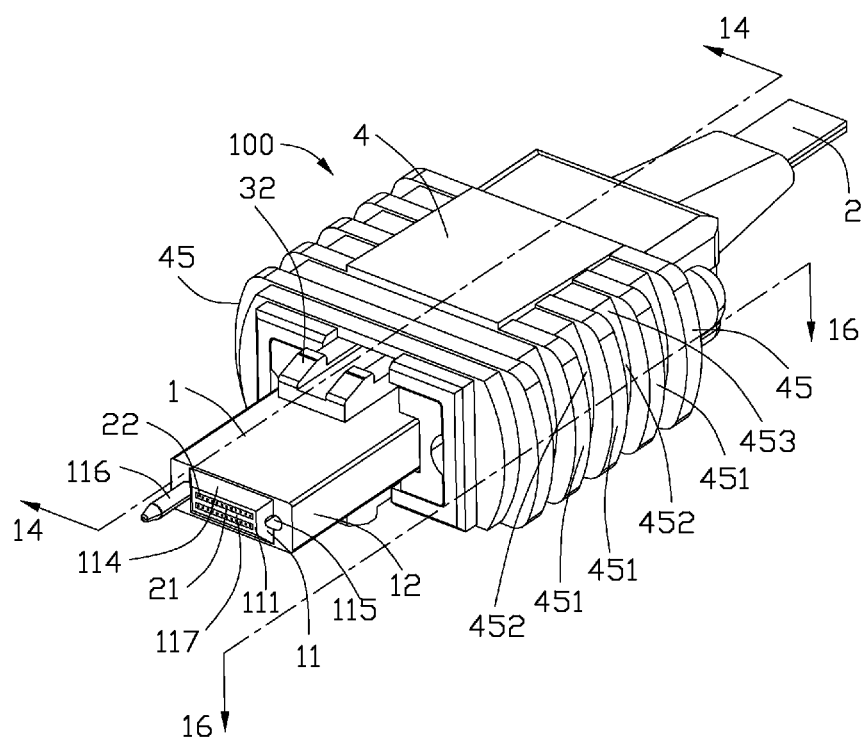
FIG. 5 is a perspective view of a waveguide connector as shown in FIG. 1.
Figure 14:
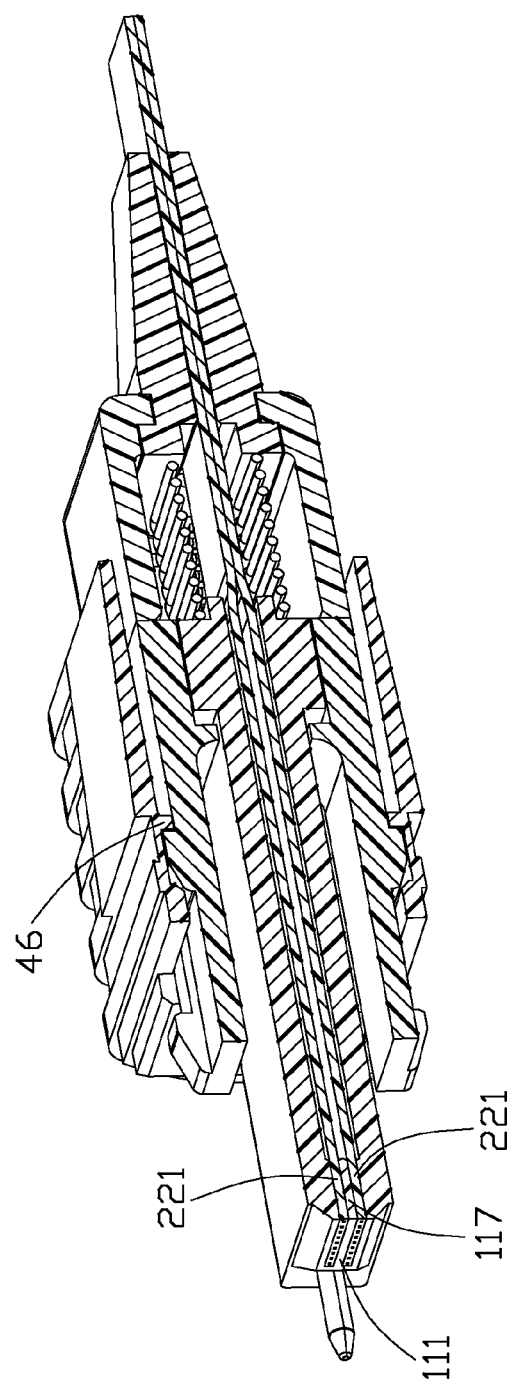
FIG. 14 is a cross-sectional view of the waveguide connector taken along line 14-14 of FIG. 5.

Referring to FIGS. 5, 12 and 13, according to the illustrated embodiment of the present invention, first and second waveguides 2 are provided to be inserted into the ferrule 1. The first and the second waveguides 2 are joined together at a rear side and are split at a front side for being easily assembled into the ferrule 1. Each waveguide 2 includes a plurality of rectangular cores 21 for light transmission and a cladding layer 22 integrally enclosing the cores 21. Front parts 221 of the cladding layers 22 are configured to be received in the first and the second front passageways 113, respectively, along a rear-to-front direction. The cores 21 are exposed to the front mating surface 111 of the ferrule 1. The cores 21 and the cladding layers 22 are of rectangular shape. Rear parts 222 of the cladding layers 22 of the first and the second waveguides 2 reside in the rear passageway 118. The cladding layers 22 each comprise four peripheral sides which are so limited by four inner surfaces of the front passageways 113, respectively, when the waveguides 2 are inserted into the ferrule 1. However, according to the illustrated embodiment of the present invention, the rear parts 222 of the cladding layers 22 are separated a distance from the rear passageway 118 as shown in FIG. 14, in order that the waveguides 2 can overcome smaller resistance during insertion into the ferrule 1.

Referring to FIGS. 7-11, the inner housing 3 includes a sleeve 31 to receive the ferrule 1, a pair of upper and lower latching arms 32 extending forwardly from the sleeve 31, and a pair of locking arms 33 extending backwardly from the sleeve 31 to lock with the outer boot 5. The sleeve 31 includes a top wall 311, a bottom wall 312, a pair of side walls 313, and opposite front and rear sides 314, 315. The upper and the lower latching arms 32 are respectively formed on the top and the bottom walls 311, 312, and cantileveredly extend beyond the front side 314 of the sleeve 31. The pair of locking arms 33 are respectively formed on the side walls 313, and cantileveredly extend beyond the rear side 315 of the sleeve 31. Each latching arm 32 includes a pair of locking protrusions 321 forwardly extending beyond the outer housing 4 for locking with the corresponding first and the second step walls 605, 606, as shown in FIG. 21, when the waveguide connector 100 is inserted into the coupler 600. An opening 322 is formed between the pair of locking protrusions 321 in each latching arm 32. The latching arm 32 further comprises a block 323 aligned with the opening 322. The block 323 is located at the rear of the locking protrusions 321 and comprises a front cam surface 324 for slideably abutting against the outer housing 4 when the outer housing 4 moves backwardly with respect to the inner housing 3 so as to deform the pair of latching arms 32 towards each other. According to the illustrated embodiment of the present invention, the cam surface 324 is slant. Besides, a pair of slits 325 are formed through the front side 314 of the sleeve 31 under an arrangement that the latching arm 32 is disposed between the pair of slits 325. As a result, the length of the latching arm 32 is prolonged and the elasticity of the latching arm 32 is improved, accordingly.

Figure 16:
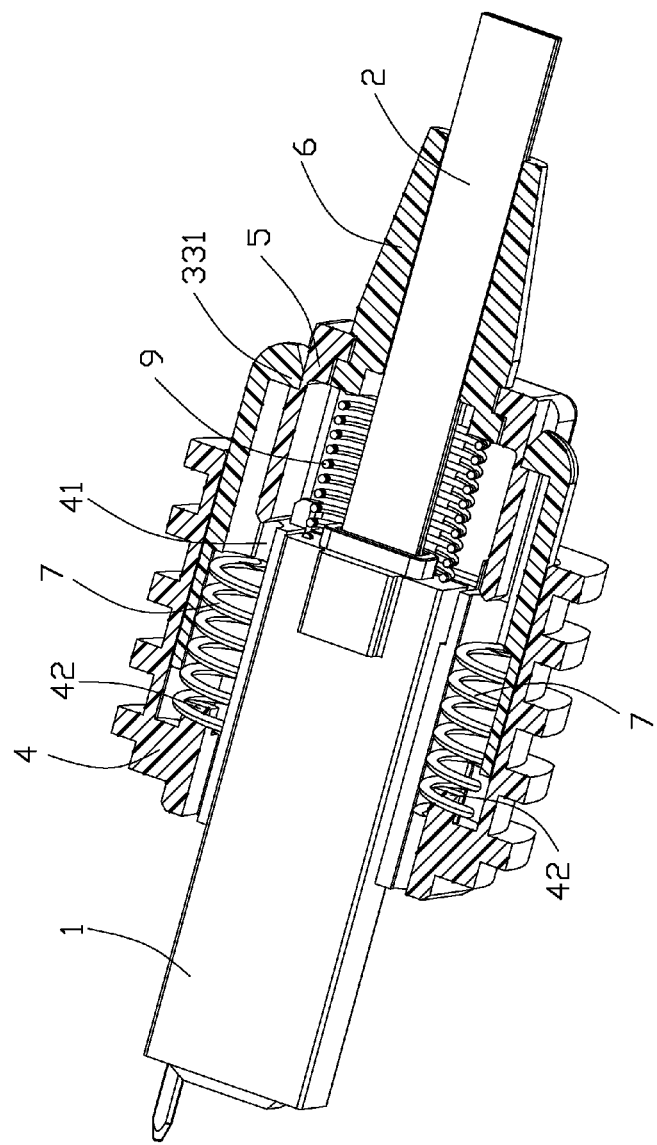
FIG. 16 is a schematic cross-sectional view of the waveguide connector taken along line 16-16 of FIG. 5 while remaining a whole ferrule, showing relationships of main components.
Figure 17:
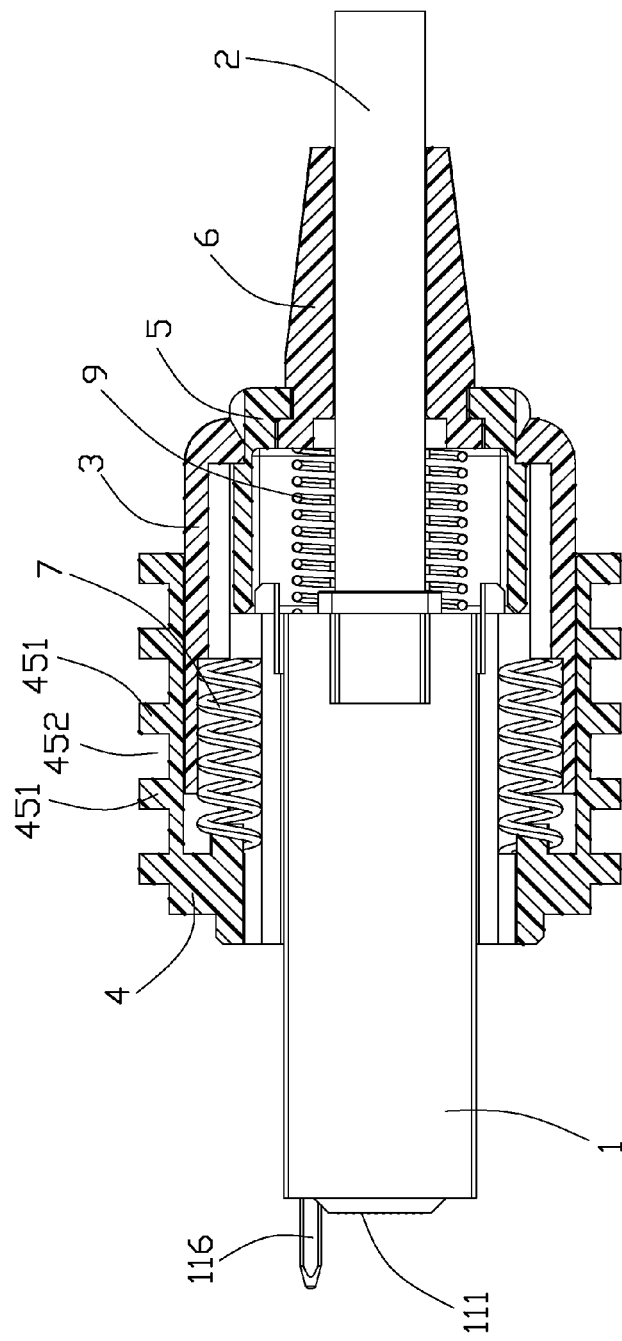
FIG. 17 is a top view of the waveguide connector as shown in FIG. 16.

Referring to FIG. 3, each locking arm 33 includes a hook 331 formed at a distal end thereof to lock with the outer boot 5 in order to combine the inner housing 3 with the outer boot 5. Each locking arm 33 has an arced peripheral surface 332 and defines with the sidewall 313 a receiving hole 333 to accommodate a coiled spring 7. As shown in FIGS. 16 and 17, the pair of coiled springs 7 are sandwiched between the outer housing 4 and the inner housing 3 so as to provide reasonable elasticity for the outer housing 4 retractable with respect to the inner housing 3 along a horizontal direction.

The outer housing 4 includes a central cavity 41 for the inner housing 3 mounted therethrough, a pair of mounting posts 42 extending into the cavity 41 for positioning the coiled springs 7, and a pair of guiding slots 43 formed on upper and lower inner sides thereof for mating with the block 323 of the inner housing 3. When the outer housing 4 is assembled to the inner housing 3 with the pair of coiled springs 7 compressed therebetween, the blocks 323 slide in the corresponding guiding slots 43. Ultimately, a pair of limit protrusions 46 of the outer housing 4 get over the blocks 323 and resist against the corresponding blocks 323, so that the outer housing 4 is prevented forward to disengage from the inner housing 3, as shown in FIGS. 13 to 15(a). Besides, due to the deformation of the coiled springs 7, the outer housing 4 is moveable backwardly with respect to the inner housing. In this process, the coiled springs 7 are driven to be further compressed, and the front cam surface 324 of each block 323 is slideably pressed by an engaging wall 44 which is directly exposed to the guiding slot 43, so as to deform the pair of latching arms 32 towards each other.

Figure 6:
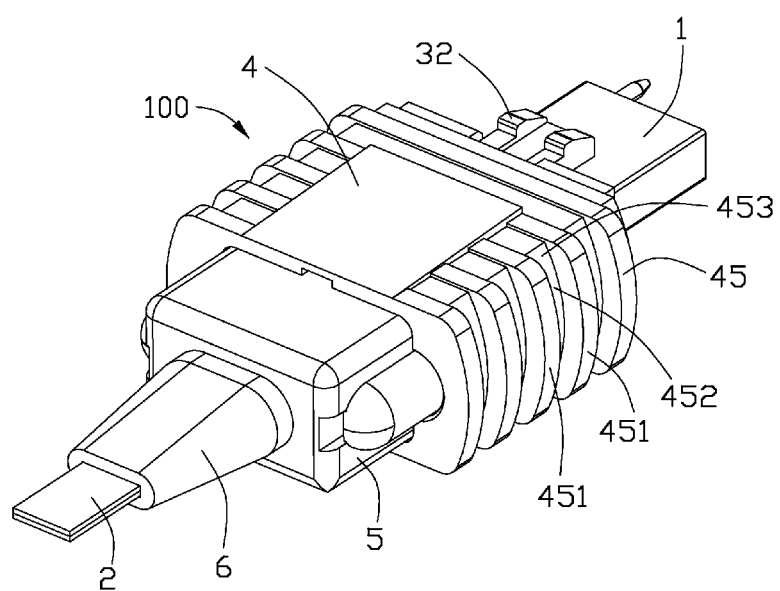
FIG. 6 is another perspective view of the waveguide connector as shown in FIG. 5.
Figure 22:
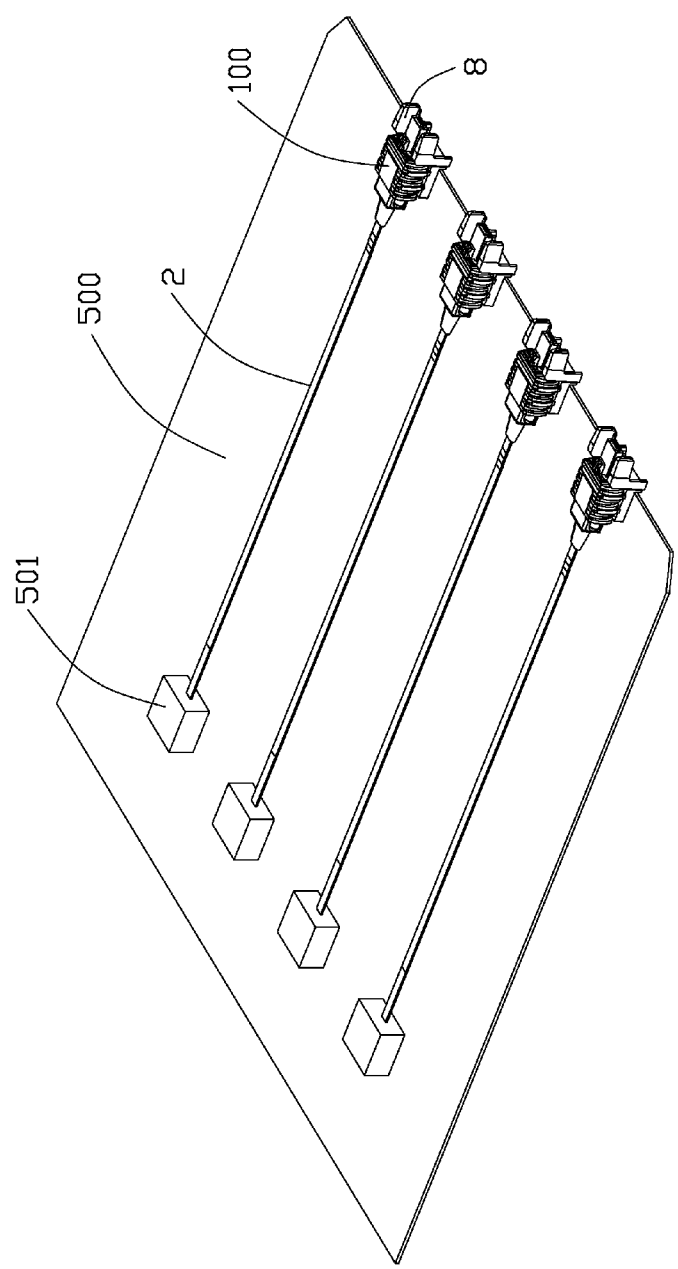
FIG. 22 is a perspective view of a part waveguide connection system showing a plurality of waveguide connectors mounted on the daughter card via a plurality of brackets.
Figure 23:
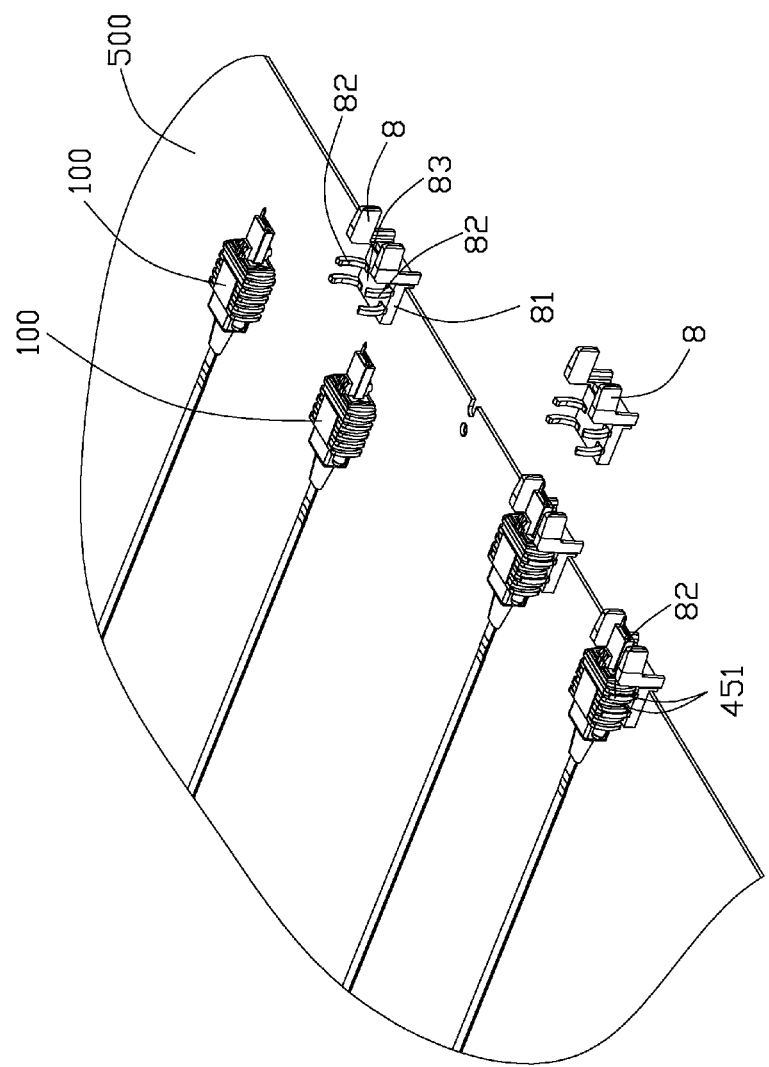
FIG. 23 is a partly exploded view of the waveguide connection system as shown in FIG. 22, showing one of the brackets disassembled from the daughter card.
Figure 24:
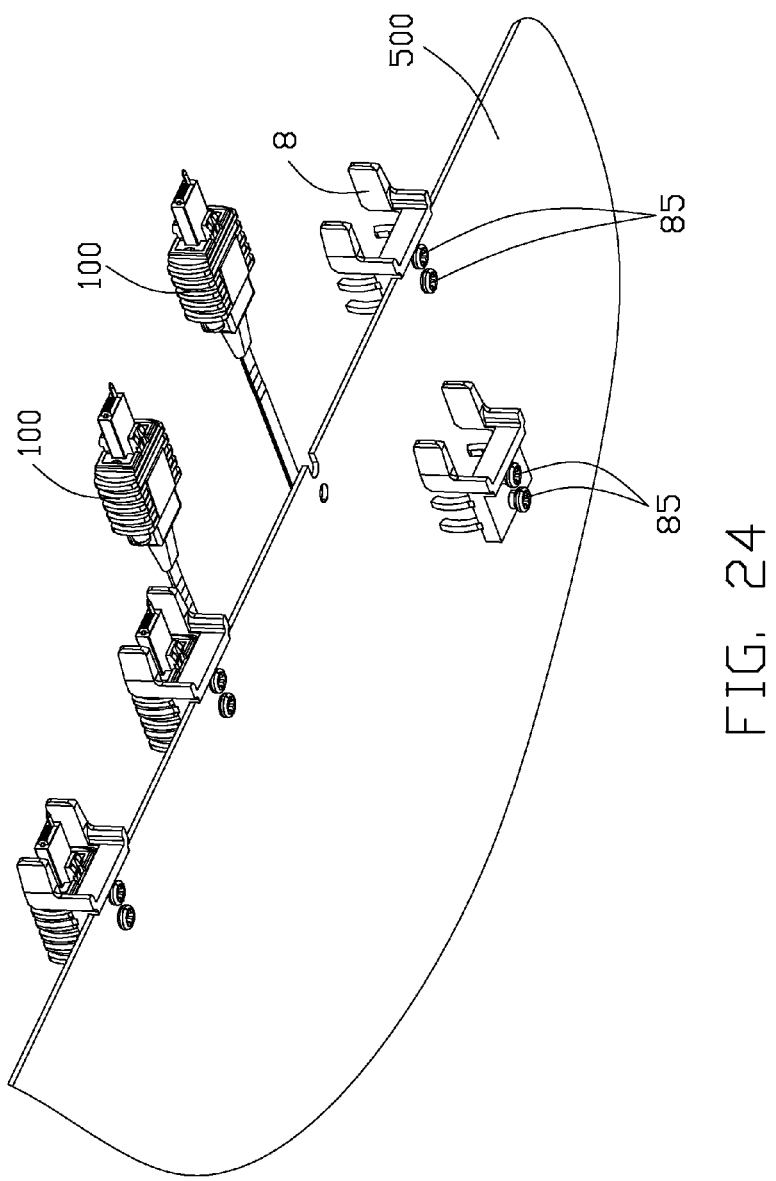
FIG. 24 is another partly exploded view of the waveguide connection system as shown in FIG. 23.

Referring to FIGS. 5 and 6, the outer housing 4 includes a pair of side walls 45 each comprising a plurality of ribs 451 and a plurality of position slots 452 formed by the adjacent ribs 451. Each rib 451 has a curved out surface similar to a bottom surface 453 of each position slot 452. As shown in FIGS. 22-24, in assembly, a plurality of brackets 8 are mounted on the daughter card 500 for receiving the outer housings 4 of multiple waveguide connectors 100. According to the illustrated embodiment of the present invention, a pair of screws 85 are provided for fixing each bracket 8 onto the daughter card 500. Each bracket 8 includes a bottom wall 81 and a plurality of deformable arms 82 protruding from the bottom wall 81. A receiving space 83 is jointly formed by the deformable arms 82 at opposite sides for receiving the outer housing 4 of each waveguide connector 100 along a direction perpendicular to the daughter card 500. Each deformable arm 82 is received in the corresponding position slot 452 of the outer housing 4. An inner wall of each deformable arm 82 is curved as well so as to be configured to attach the bottom surface 453 of the position slot 452. Each waveguide connector 100 is prevented from falling off from the bracket 8 because the distal end of each deformable arm 82 presses against the upper side of the outer housing 4 along the direction perpendicular to the daughter card 500. Besides, each deformable arm 82 is limited by the adjacent ribs 451 so that the waveguide connector 100 can be prevented from horizontal removal with respect to the bracket 8. According to the illustrated embodiment of the present invention, the brackets 8 are made of insulative materials, such as plastic, rubber, etc., and the deformable arms 82 are integrally formed with the bottom wall 81. However, in alternative embodiments, the deformable arms 82 can be replaced with metal such as stamped steel clips, or the like. The deformable arms 82 can be separately made and then assembled together.

The outer boot 5 is rectangular shaped and includes a top wall 51, a bottom wall 52, a pair of side walls 53 connecting the top wall 51 and the bottom wall 52, and a rear wall 54. A receiving space 50 is defined by the above-mentioned peripheral walls and further extending through the rear wall 54. Each side wall 53 defines a guiding slot 531 through a front edge thereof, and a step wall 532 at the rear of the guiding slot 531.

Referring to FIGS. 10-17, the inner boot 6 is made of rubber and includes a front portion 61, a rear portion 62 and a neck 63 between the front portion 61 and the rear portion 62. A flat channel 60 is formed through the inner boot 6 along the horizontal direction for receiving the waveguides 2.

Figure 7:
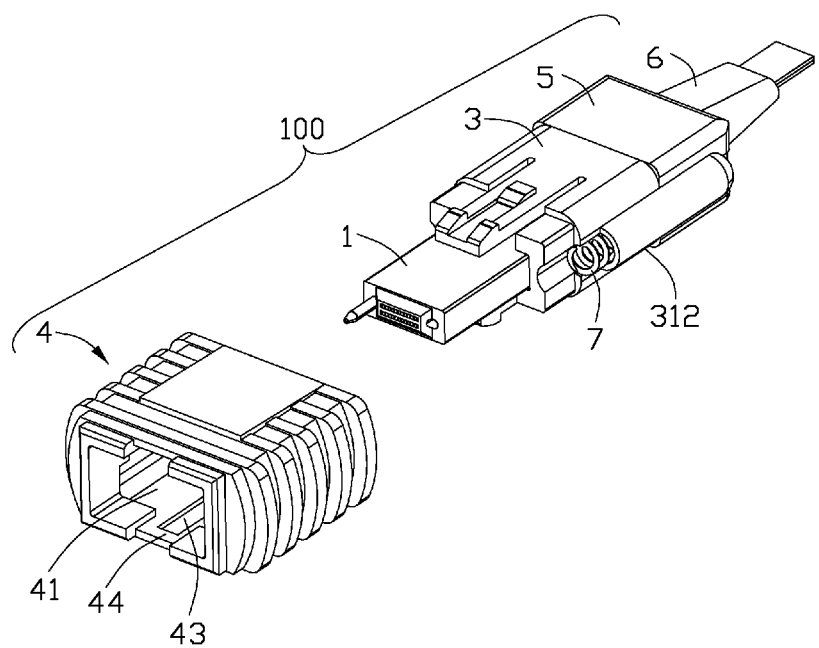
FIG. 7 is a partly assembled view of the waveguide connector as shown in FIG. 5 before an outer housing mounted thereto.
Figure 8:
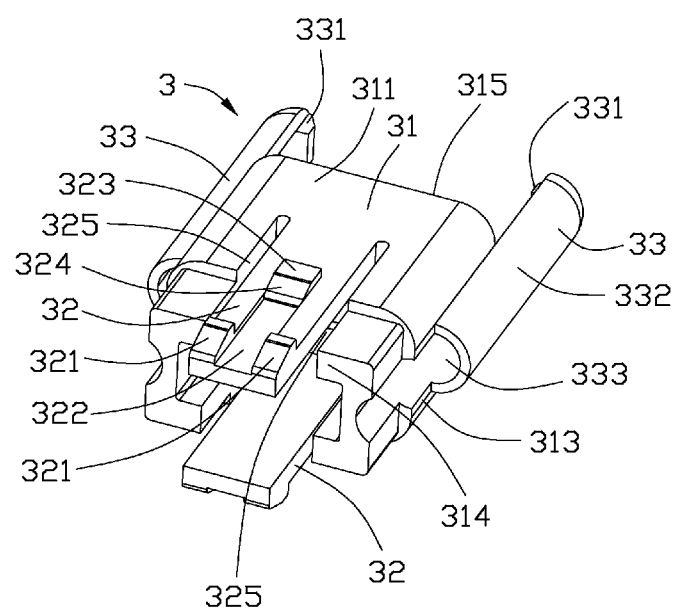
FIG. 8 is a perspective view of an inner housing as shown in FIG. 7.

In assembly, small quantity of heat-curable epoxy (not shown) is placed into the rectangular passageways 113 through the rear surface 112 of the ferrule 1 for lubrication, if needed. The waveguides 2 are then inserted into the corresponding passageways 113 along the rear-to-front direction till the waveguides 2 protrude slightly beyond the front mating surface 111 of the ferrule 1, as shown in FIG. 7. Under this condition, the four peripheral sides of each cladding layer 22 are so limited by the corresponding four inner surfaces of the rectangular passageway 113 for precisely alignment. The ferrule 1 is formed in one-piece for strong structure and easy manufacture. According to the illustrated embodiment of the present invention, equal forces can be ensured to automatically align the waveguides 2 to the ferrule 1, and attaching the waveguides 2 to the ferrule 1 is expected to be much more manufacturing-friendly as there is no need to visually inspect to confirm the light-transmitting cores 21 are precisely aligned in such process. After the step of inserting, heat is applied to cure the waveguides 2 so that they can be fixed in the passageways 113 of the ferrule 1. During insertion of the waveguides 2 into the passageways 113, end-surfaces of the waveguides 2 are easily polluted/damaged such as by the heat-curable epoxy, so as to be unsuitable for light transmission. According to the illustrated embodiment of the present invention, in order to avoid this shortcoming, the waveguides 2 slightly extending beyond the front mating surface 111 of the ferrule 1 are then polished substantially flush with the front mating surface 111, so that the rectangular cores 21 and the cladding layers 22 are new and are exposed to the front mating surface 111, as shown in FIG. 5.

Figure 9:
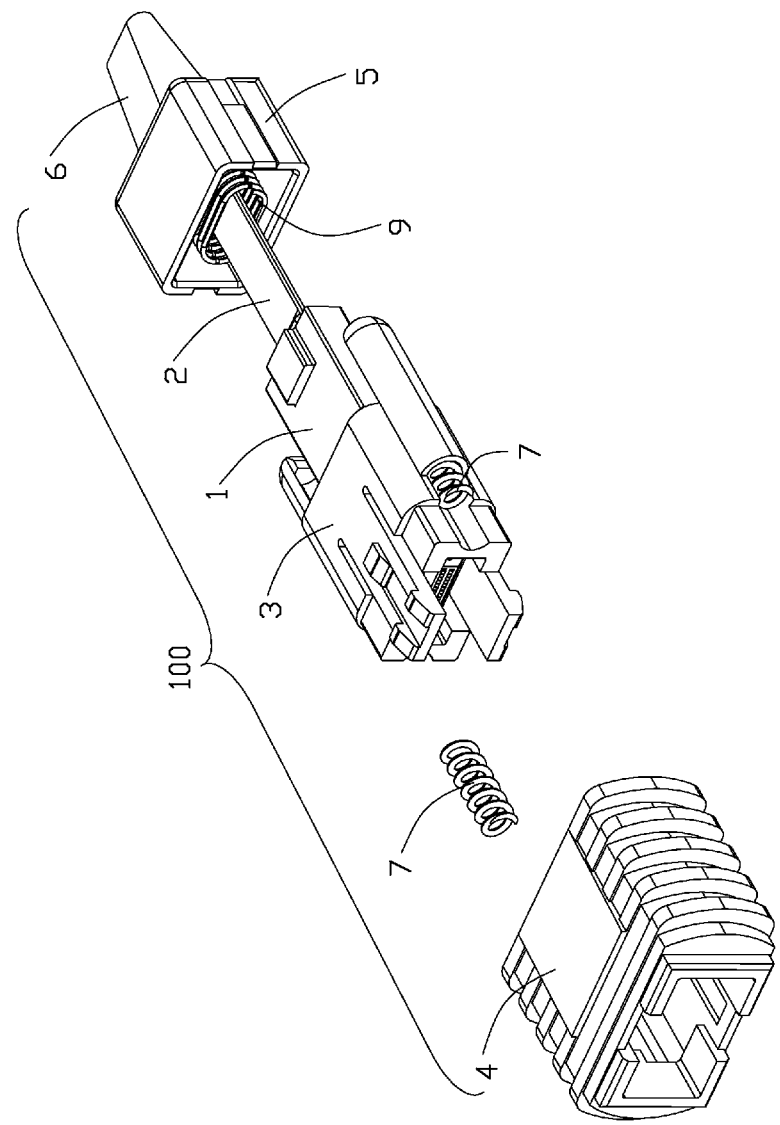
FIG. 9 is a further exploded view of the waveguide connector as shown in FIG. 5.
Figure 15A:
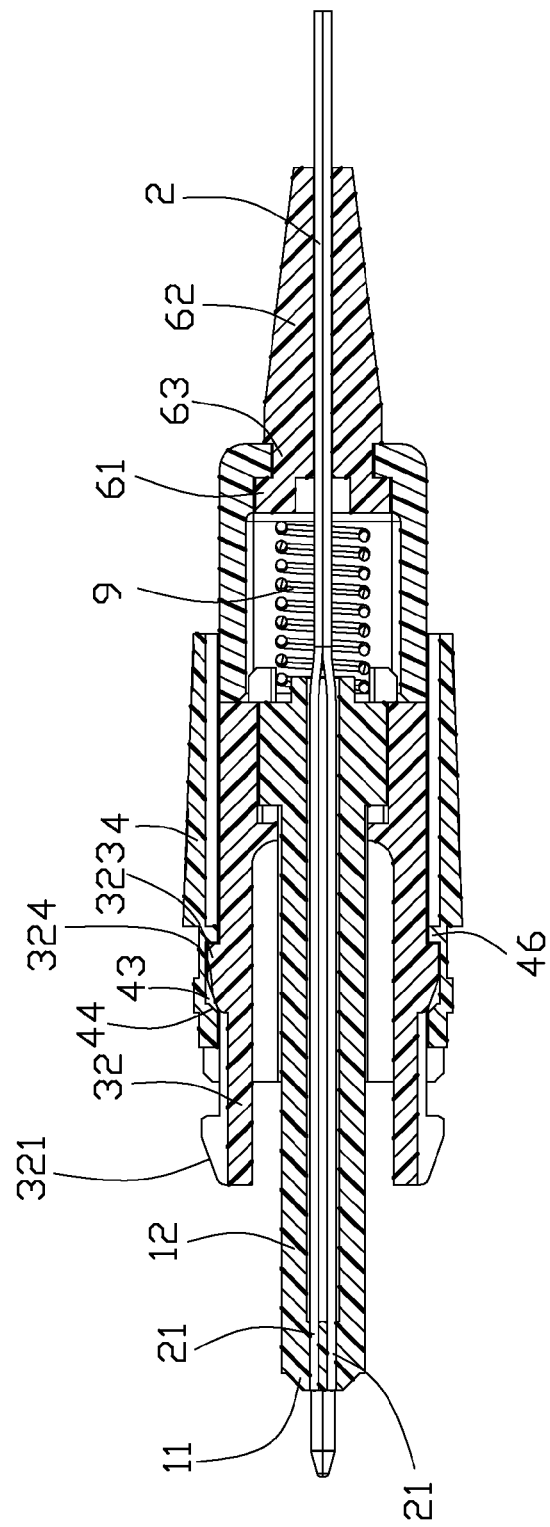
FIG. 15($a$) is a cross-sectional view of the waveguide connector taken along line 15-15 of FIG. 5, showing the outer housing assembled onto the inner housing under an original status.
Figure 15B:
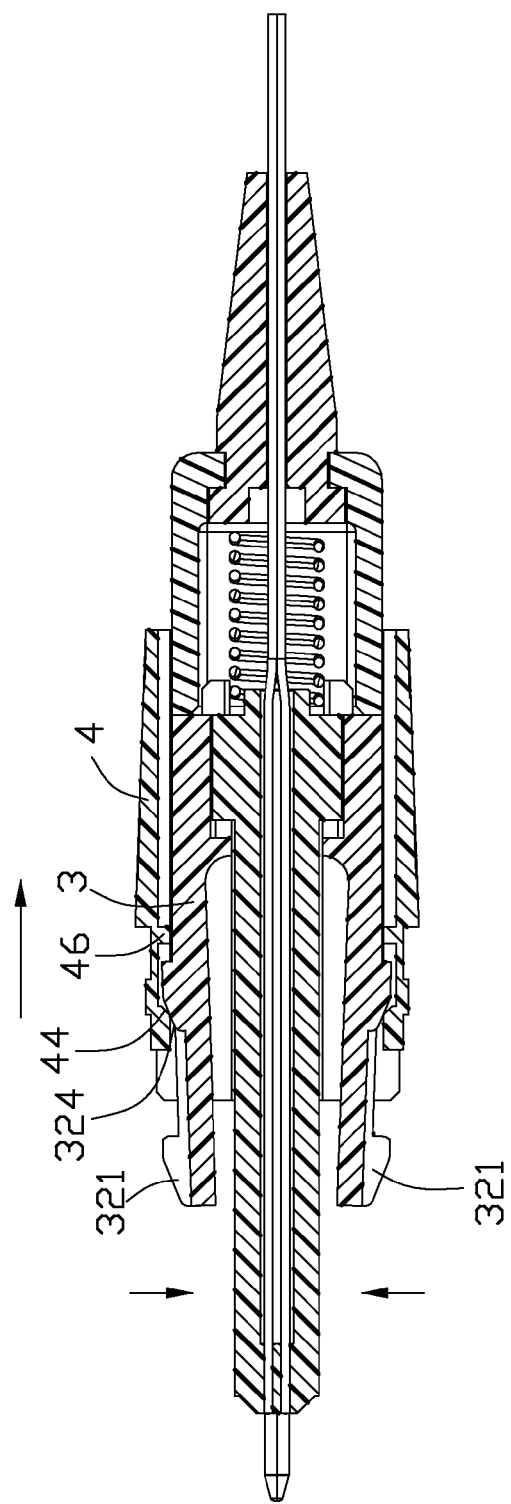

As shown in FIG. 9, the pair of coiled springs 7 are inserted into the receiving holes 333 of the inner housing 3 along the front-to-back direction. Referring to FIGS. 15(*a*) to 17, the outer housing 4 is then slideably mounted onto the inner housing 3 with the coiled springs 7 sandwiched therebetween, as shown in FIGS. 15(*a*) to 17. The inner boot 6 is inserted through the receiving space 50 of the outer boot 5 along the front-to-back direction till the front portion 61 abutting against the rear wall 54. Under this condition, the neck 63 of the inner boot 6 is locked by the rear wall 54 and the rear portion 62 extends beyond the rear wall 54.

As shown in FIGS. 7, 10 and 15(*a*), a flat coiled spring 9 is mounted through the rear side of the waveguides 2 which is then inserted into the flat channel 60 of the inner boot 6 till the waveguides 2 protrude beyond the rear portion 62. The inner housing 3 is then slideably mounted to lock with the outer boot 5 as shown in FIGS. 16 and 17.

As shown in FIG. 1, according to the illustrated embodiment of the present invention, the waveguides 2 are coupled with a pair of waveguide connectors 100 at opposite ends. In connection, as shown in FIGS. 18 and 19, the couplers 600 are mounted into the mounting holes 401 of the backplane 400, then a pair of waveguide connectors 100 are inserted into the couplers 600 along opposite directions. Under the guiding of the guiding post 116 of one waveguide connector 100 inserted into the corresponding hole 115 of the other waveguide connector 100, the pair of waveguide connectors 100 are precisely aligned as well as the cores 21. The waveguides 2 of the pair of waveguide connectors 100 floatably meet at the front mating surfaces 111, under the action of the flat coiled springs 9, for light transmission.

Take one waveguide connector 100 for example, with the waveguide connector 100 fully inserted into the first receiving cavity 603 of the coupler 600, the pair of locking protrusions 321 lock with the corresponding first and the second step walls 605, 606 of the coupler 600. However, when the waveguide connector 100 is disassembled from the coupler 600, a force may be applied to drive the outer housing 4 moveable along a direction opposite to the insertion direction. As shown in FIG. 15(*b*), in this process, the front cam surfaces 324 are slideably pressed by the stop wall 44 of the outer housing 4 so as to deform the pair of latching arms 32 towards each other. As a result, such deformation results in disassembly of the latching arms 32 and the first and the second step walls 605, 606, and the waveguide connector 100 can be removed from the coupler 600. However, under the released elasticity of the coiled springs 7, the outer housing 4 is accordingly driven to an original position.

It is to be understood, however, that even though numerous, characteristics and advantages of the present invention have been set forth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A waveguide connector comprising:
   a ferrule defining a front mating surface, a rear surface opposite to the front mating surface, a front passageway extending through the front mating surface, and a rear passageway extending through the rear surface, the front passageway and the rear passageway being in communication with each other, the front passageway being thinner than the rear passageway; and
   a waveguide comprising a plurality of cores and a cladding layer enclosing the cores, a rear part of the cladding layer residing in the rear passageway and a front part of the cladding layer being received in the front passageway along a rear-to-front direction, the cores being exposed at the front mating surface for light transmission; wherein
   the front part of the cladding layer is of rectangular shape and comprises four peripheral surfaces confined by four inner surfaces of the front passageway, respectively.

2. The waveguide connector as claimed in claim 1, wherein the rear part of the cladding layer is separated a distance from the rear passageway.

3. The waveguide connector as claimed in claim 1, wherein the ferrule is formed in one-piece and comprises an upper surface and a lower surface, and the front and the rear passageways are both located between the upper surface and the lower surface.

4. The waveguide connector as claimed in claim 1, wherein the ferrule comprises another front passageway extending through the front mating surface and in communication with the rear passageway, the front passageway and the another front passageway being parallel to and separated from each other, the waveguide connector further comprising another waveguide received in the another front passageway, the waveguide and the another waveguide being split at a front side thereof while joined together at a rear side thereof.

5. The waveguide connector as claimed in claim 1, further comprising an inner housing through which the ferrule extends, an outer housing moveably assembled on the inner housing, and an outer boot attached to the inner housing.

6. The waveguide connector as claimed in claim 5, wherein the inner housing comprises a sleeve to receive the ferrule, a pair of upper and lower latching arms extending forwardly from the sleeve, and a pair of locking arms extending backwardly from the sleeve to lock with the outer boot.

7. The waveguide connector as claimed in claim 6, wherein the sleeve comprises opposite front and rear sides, the upper and the lower latching arms cantileveredly extending beyond the front side, and the locking arms cantileveredly extending beyond the rear side, each locking arm comprising a hook at a distal end thereof to combine with the outer boot.

8. The waveguide connector as claimed in claim 7, wherein the sleeve comprises top and bottom walls from which the upper and the lower latching arms integrally extend, respectively, and a pair of side walls from which the pair of locking arms integrally extend.

9. The waveguide connector as claimed in claim 7, further comprising a pair of coiled springs abutting against the outer housing, and wherein each locking arm defines a receiving hole to accommodate the coiled spring so that the outer housing is retractable with respect to the inner housing.

10. The waveguide connector as claimed in claim 9, wherein each latching arm comprises a pair of locking protrusions forwardly extending beyond the outer housing and a block located behind the locking protrusions, the block comprising a front cam surface slideably abutting against the outer housing when the outer housing moves backwardly with respect to the inner housing so as to deform the pair of latching arms towards each other.

11. The waveguide connector as claimed in claim 1, wherein the waveguide is polished substantially flush with the front mating surface of the ferrule after the waveguide is inserted through the front mating surface.

12. A waveguide connector comprising:

a ferrule defining a front mating surface, a rear surface opposite to the front mating surface, a pair of parallel first and second front passageways extending through the front mating surface, and a rear passageway extending through the rear surface, the first and the second passageways being separated from each other and being in communication with the rear passageway; and first and second waveguides each comprising a plurality of cores and a cladding layer enclosing the cores, the first and the second waveguides being joined together at a rear side thereof and being split at a front side thereof, rear parts of the cladding layers of the first and the second waveguides residing in the rear passageway, front parts of the cladding layers of the first and the second waveguides being received in the first and second front passageways along a rear-to-front direction, respectively; the cores being exposed to the front mating surface for light transmission; wherein front parts of the cladding layers are limited by inner surfaces of the first and the second front passageways, respectively.

13. The waveguide connector as claimed in claim 12, wherein each front part of the cladding layers is of rectangular shape and comprises four peripheral surfaces which are so limited by four inner surfaces of a corresponding one of the first and the second front passageways, respectively.

14. The waveguide connector as claimed in claim 12, wherein the rear parts of the cladding layers are separated a distance from the rear passageway.

15. The waveguide connector as claimed in claim 12, wherein both the first and the second front passageways are thinner than the rear passageway.

16. The waveguide connector as claimed in claim 12, wherein the ferrule comprises a partition wall separating the first front passageway from the second front passageway.

17. A waveguide connector for use with a coupler and a complementary optical connector therein, comprising: a ferrule receiving an elongated waveguide therein; an inner housing enclosing a front portion of the ferrule with a front end section extending forwardly beyond a front end of the inner housing; an outer housing enclosing the inner housing with a front end section of the inner housing extending forwardly beyond a front end of the outer housing; a boot structure enclosing a rear portion of the ferrule with a rear end section of the ferrule extending rearwardly beyond a rear end of the boot structure; wherein the front end of the inner housing is equipped with a latch for retaining to the coupler.

18. The waveguide connector as claimed in claim 17, wherein a first spring is provided between the inner housing and the outer housing to constantly urge the inner housing to move rearwardly away from the outer housing, thus assuring latching of the inner housing against the coupler.

19. The waveguide connector as claimed in claim 18, wherein a second spring is provided between the inner housing and the ferrule to constantly urge the ferrule to move forwardly away from the inner housing, thus assuring the ferrule with the associated waveguide intimately coupling to a complementary optical connector.

20. The waveguide connector as claimed in claim 19, wherein a front end section of the ferrule snugly receives the waveguide therein without relative movement therebetween in all directions.

* * * * *